United States Patent
Tuck et al.

(10) Patent No.: US 6,870,844 B2
(45) Date of Patent: Mar. 22, 2005

(54) APPARATUS AND METHODS FOR EFFICIENT MULTICASTING OF DATA PACKETS

(75) Inventors: Russ Tuck, San Jose, CA (US); David Skirmont, Redwood City, CA (US); Puneet Agarwal, San Francisco, CA (US)

(73) Assignee: Pluris, Inc., Cupertino, CA (US)

( * ) Notice: Subject to any disclaimer, the term of this patent is extended or adjusted under 35 U.S.C. 154(b) by 21 days.

(21) Appl. No.: 09/854,234

(22) Filed: May 10, 2001

(65) Prior Publication Data

US 2002/0126669 A1 Sep. 12, 2002

Related U.S. Application Data

(63) Continuation-in-part of application No. 09/800,678, filed on Mar. 6, 2001.

(51) Int. Cl.[7] .............................................. H04L 12/28
(52) U.S. Cl. ........................................ 370/390; 370/392
(58) Field of Search ................................ 370/389, 390, 370/256, 409, 405, 432, 392, 388, 419, 473, 236, 325, 395, 42, 399, 551, 395.1, 395.2, 395.5, 905, 395.31, 401, 466; 455/12.1

(56) References Cited

U.S. PATENT DOCUMENTS

| | | | | |
|---|---|---|---|---|
| 4,734,907 A | * | 3/1988 | Turner | 370/390 |
| 4,991,171 A | * | 2/1991 | Teraslinna et al. | 370/388 |
| 5,138,614 A | * | 8/1992 | Baumgartner et al. | 370/390 |
| 5,689,506 A | * | 11/1997 | Chiussi et al. | 370/390 |
| 5,724,351 A | * | 3/1998 | Chao et al. | 370/389 |
| 5,898,687 A | * | 4/1999 | Harriman et al. | 370/390 |
| 6,052,373 A | * | 4/2000 | Lau | 370/399 |
| 6,201,809 B1 | * | 3/2001 | Lewin et al. | 370/392 |
| 6,226,292 B1 | * | 5/2001 | DiPlacido | 370/395.7 |
| 6,240,075 B1 | * | 5/2001 | Takahashi et al. | 370/325 |
| 6,353,596 B1 | * | 3/2002 | Grossglauser et al. | 370/390 |
| 6,396,809 B1 | * | 5/2002 | Holden et al. | 370/236 |
| 6,400,925 B1 | * | 6/2002 | Tirabassi et al. | 455/12.1 |
| 6,477,169 B1 | * | 11/2002 | Angle et al. | 370/395.42 |
| 6,625,156 B2 | * | 9/2003 | Shaio et al. | 370/389 |

OTHER PUBLICATIONS

U.S. Appl. No. 09/800,678, Deepak Mansharamani et al., Priority document.

* cited by examiner

*Primary Examiner*—Duc Ho
*Assistant Examiner*—Phuongchau Ba Nguyen
(74) *Attorney, Agent, or Firm*—Donald R. Boys; Central Coast Patent Agency, Inc

(57) ABSTRACT

A multicast engine is provided in plurality within a router for replicating and/or modifying packets identified as multicast packets. In preferred embodiments the engine is integrated with one or more ports of a router, particularly with one or more ports of fabric cards. In one implementation the multicast engine is associated with a table having instructions for replicating or modifying multicast packets received, and forwarding the packets accordingly.

28 Claims, 6 Drawing Sheets

Multi-Cast Port (ASIC)

APPARATUS AND METHODS FOR EFFICIENT MULTICASTING OF DATA PACKETS

CROSS-REFERENCE TO RELATED DOCUMENTS

The present invention is a Continuation In Part (CIP) to a U.S. patent application Ser. No. 09/800,678, entitled An Improved System for Fabric Packet Control, filed Mar. 6, 2001, which is incorporated herein in its entirety by reference.

FIELD OF THE INVENTION

The present invention is in the field of routing packets between nodes in a router fabric, and pertains in particular to methods for multicasting data packets at fabric level within a data router.

BACKGROUND OF THE INVENTION

With the advent and continued development of the well-known Internet network, and of similar data-packet networks, much attention has been paid to computing machines for receiving, processing, and forwarding data packets. Such machines, known as routers in the art typically have multiple interfaces for receiving and sending packets, and circuitry at each interface, including typically a processor, for handling and processing packets. The circuitry at the interfaces is implemented on modules known as line cards in the art, and all of the line cards are interconnected through what is known as the internal fabric, which comprises interconnected fabric cards handling transmissions through the fabric.

FIG. 1, labeled prior art, illustrates a number of interconnected fabric nodes, labeled in this example A through J, each node of which may be fairly considered to comprise a fabric card in a switching fabric in a router. It will be apparent to the skilled artisan that FIG. 1 is an exemplary and partial representation of nodes and interconnections in a switching fabric, and that there are typically many more nodes and interconnections than those shown.

One purpose of FIG. 1 in this context is to illustrate that there are a wide variety of alternative paths that data may take within a switching fabric. For example, transmission from node E to node J may proceed either via path E-F-H-G-J, or alternatively via E-F-D-G-J. The skilled artisan will also recognize that the nodes and interconnections shown are but a tiny fraction of the nodes and interconnections that might be extant in a practical system In conventional switching fabric at the time of the present patent application fabric nodes in such a structure are implemented on fabric cards that include a microprocessor and code for doing Flow Control. Such Flow Control is very well-known in the art, and comprises a process of monitoring ports at fabric cards for traffic and faults, and notifying upstream connections for any fault. That is, if node G as shown in FIG. 1, becomes overloaded, the Flow Control at G will notify D, H, I and J of the problem (and any other nodes to which G may be connected), and these nodes will restrict or suspend traffic to G in response, and divert traffic to alternative paths. In this Flow Control, Flow Control messages received by nodes are used to propagate the same or different flow control messages to other upstream nodes. In FIG. 1 arrows between nodes are indicative of Flow Control messages passed, and the skilled artisan will also understand that traffic may be in any direction, and that Flow Control messages are therefore passes in both directions as well.

A serious problem with Flow Control as conventionally practiced is that the upstream notifications, inherent in flow control, propagate further upstream and hinder or stop traffic that there is no need to stop, partly because the interconnections of nodes may be quite complicated and the alternative paths quite numerous. This effect, because of the complexity and interconnection of nodes in a fabric, can result in complete stultification of parts of a system, or of an entire network.

There have been in the art several attempts to improve upon flow control, but all such solutions have only been partly successful, and still use upstream propagation of control messages, which always still have a good chance of causing unwanted difficulty.

A method for managing data traffic in nodes making up a fabric network is known to the inventor. Each node has at least two, but typically more, external ports and the individual ports of each node are coupled internally by a switching mechanism, known as a crossbar, to other ports of the node. This method involves the steps of establishing a virtual output queue (VOQ) and a queue manager in each incoming port path of the node, termed a fabric card, for managing incoming data traffic at each port. In this data-routing system, all data is passed from an ingress port of the node to an egress port of the node as long as the queue in the path between the ports is less than full. Ingress packets are discarded in a port path having a full queue until the queue level is again less than full.

In some cases the queue manager monitors queue level in relation to a preset threshold, and begins to discard data at a predetermined rate when queue level reaches the threshold. In other cases the queue manager increases the rate of discarding as queue level increases above the preset threshold, discarding all data traffic when the queue is completely full. The method enables data management to be efficiently accomplished in a fabric network without requiring conventional flow control, which requires upstream propagation of flow control indications, and in a manner that loses less traffic and is less complex than with prior-art methods.

In view of the contribution to the art of data-packet routing described above, it has occurred to the inventor that in addition to managing data without requiring prior-art flow control methods, other data management tasks may be performed with little modification to the ports described above. One of these tasks is creating copies of packets for multicasting data to a plurality of final network destinations.

It is well-known that multicasting requires making multiple copies of data packets, the copies having all the same destination addresses. The number of copies that are required in a multicasting process is, of course, a function of the number of destinations to receive the same data. The spawning of multiple copies of packets for multicasting of data, as is known in the art, is in some cases, performed by data routers set up in a network topology. For example, one or more routers running multicast software are provided for replicating the required total or assigned portion of multicast packets, which are then routed on to their destinations. As opposed to broadcast data wherein multiple users connect to a common customer access point hosted within local network topology, multicast data is pushed to all subscribing users whose addresses are listed in a multicast group typically identified in a data list. Other methods include use of multicast servers, which are typically employed for very large multicast operations.

One liability inherent to prior and current art multicast methods as practiced on a data-packet-network is that routers that are enhanced for multicasting are non-scalable, in amount of multicast traffic, in the number of copies made of each multicast packet, and in the number of router ports. Although multicasting may be distributed over many routers or multicast servers in a network, where routers are used, each router has limits on its multicast forwarding performance. As described above, for very large projects, multicast servers are most often used because of available processing power not dedicated for other purposes.

It is desirable to provide multicasting capability within a router that is scaleable for large projects, yet does not create bottlenecks or other problems within the router or routers designated for multicasting.

What is clearly needed is a method and apparatus for enabling multicast capability within a data router having multiple router cards such that multicasting activity may be appropriated to multiple multicast components within the router thereby not taxing any one component or path of the router. Such a method and apparatus would be scalable for large numbers of router ports and heavy multicast traffic and could similarly be appropriated to a plurality of cooperating routers in a given network eliminating a prior-art requirement for use of powerful multicast servers for large assignments.

SUMMARY OF THE INVENTION

In a preferred embodiment of the present invention a multicast-capable port for replicating multicast data packets is provided, comprising at least one ingress path into the port for receiving the data packets, at least one egress path out of the port for outputting data packets, and multicast-capable component coupled to the egress and ingress paths of the port, the multicast-capable component for replicating and readdressing the replicated data packets. The port is characterized in that data packets assigned for multicasting arrive at the port on the egress path and are diverted to the multicast-capable component, wherein the packets are replicated or re-addressed and output to the ingress path.

In some embodiments the port is hosted on a card within a data router. Also in some embodiments the port is coupled to other ingress/egress ports of the card. Further, there may be more than one multicast-capable port mounted on a same card. Still further, there may be multiple cards within the data router, individual ones of which host at least one multicast-capable port. In some cases the data router is connected to other like data routers distributed over network topology, and individual ones of the multicast-capable ports associated therewith are responsible for a portion of a multicast project.

The port provided as described just above may be implemented as an integrated circuit in some embodiments, and may be either a part of the IC of a port, or separate from the port as a separate IC. Regardless of implementation, in preferred embodiments there is a table associated with the engine containing instruction for multicasting, table entries being configured by software.

In another aspect of the invention a multicast-capable fabric card within a data router is provided, comprising at least two ports coupled to each other by data paths, and at least one multicast engine, characterized in that data packets assigned for multicasting arrive at the multicast-capable fabric card and are delivered to the multicast engine wherein they are replicated and/or modified as needed for multicast and forwarded.

In some embodiments the card is coupled by port paths to other cards within the same router. Also in some embodiments there is a switching facility provided on the card, the switching facility for managing port-to-port communication. The multicast-capable port may be an integrated circuit. In preferred embodiments there is a table containing instruction for multicasting, table entries being configured by software.

In still another aspect of the invention a multicast engine is provided, comprising one or more first ports for communicating with one or more second ports of one or switch elements, and circuitry for modifying or replicating multicast packets routed to the engine, characterized in that multicast packets received from the one or more fabric cards are replicated and/or modified as needed, and forwarded via the one or more first ports to one of the one or more of the second ports.

In still another aspect of the invention a multicast-capable data router having a multicast-capable port for replicating multicast data packets is provided, the port having at least one ingress path into the port for receiving the data packets, at least one egress path out of the port for outputting data packets, and a multicast-capable component coupled to the egress and ingress paths of the port, the multicast-capable component for replicating and re-addressing the replicated data packets. The router is characterized in that data packets assigned for multicasting arrive at the port and are diverted to the multicast-capable component, wherein the packets are replicated or re-addressed and forwarded.

In some embodiments of the router provided the multicast-capable component is integrated into the circuitry of the multicast-capable port. Also in some embodiments the multicast-capable port is a fabric card port, and may be an external port. There may also be, in preferred embodiments, a table containing instructions for multicasting.

In still another aspect of the invention a multicast-capable data router having a fabric card comprising at least two ports coupled to each other by data paths, and at least one multicast engine is provided, characterized in that data packets assigned for multicasting arrive at the fabric card and are delivered to the multicast engine wherein they are replicated and/or modified as needed for multicast and forwarded.

In some embodiments of this router the multicast-capable component is integrated into the circuitry of the one of the ports of the multicast-capable fabric card, and in preferred embodiments there is a table containing instructions for multicasting.

In yet another aspect a multicast-capable data router, comprising a multicast engine having one or more first ports for communicating with one or more second ports of one or more fabric cards, and circuitry for modifying or replicating multicast packets routed to the engine is provided, characterized in that multicast packets received from the one or more fabric cards are replicated and/or modified as needed, and forwarded via one or more of the first ports to one or more of the second ports. In this router, in some embodiments the multicast engine is integrated into the circuitry one of the ports of the fabric card, and there is a table containing instructions for multicasting.

In still another aspect a method for multicasting is provided, comprising steps of (a) providing a plurality of multicast engines within a router, each having one or more first ports for communicating with second ports of the router; (b) receiving multicast packets at one of the second ports and sending the multicast packets to one of the multicast engines via the first ports; (c) replicating and/or modifying the data packets for multicasting according to tabled instructions associated with the multicast engine; and (d) forwarding the replicated or modified packets to individual ones of the second ports.

In this method, in some embodiments, the multicast engine is integrated as a part of a port of a line card in the router, in some other embodiments the multicast engine is integrated as a part of a port of a fabric card in the router. In some cases the multicast engine is a stand-alone component and the second ports with which the first ports communicate are ports of one or more fabric cards in the router.

In some embodiments of the method, in step (a) there are a plurality of interconnected routers, individual ones having multicast engines, and wherein, in step (d), replicated or modified packets are forwarded to individual ones of the plurality of interconnected routers. Tabled instructions associated with individual multicast engines are updated periodically.

In the various embodiments of the invention, described in enabling detail below, for the first time multicasting capability is provided in a router in a way that a multi-casting project can be quickly and efficiently executed.

BRIEF DESCRIPTION OF THE DRAWING FIGURES

DESCRIPTION OF THE PREFERRED EMBODIMENTS

Figure 1:
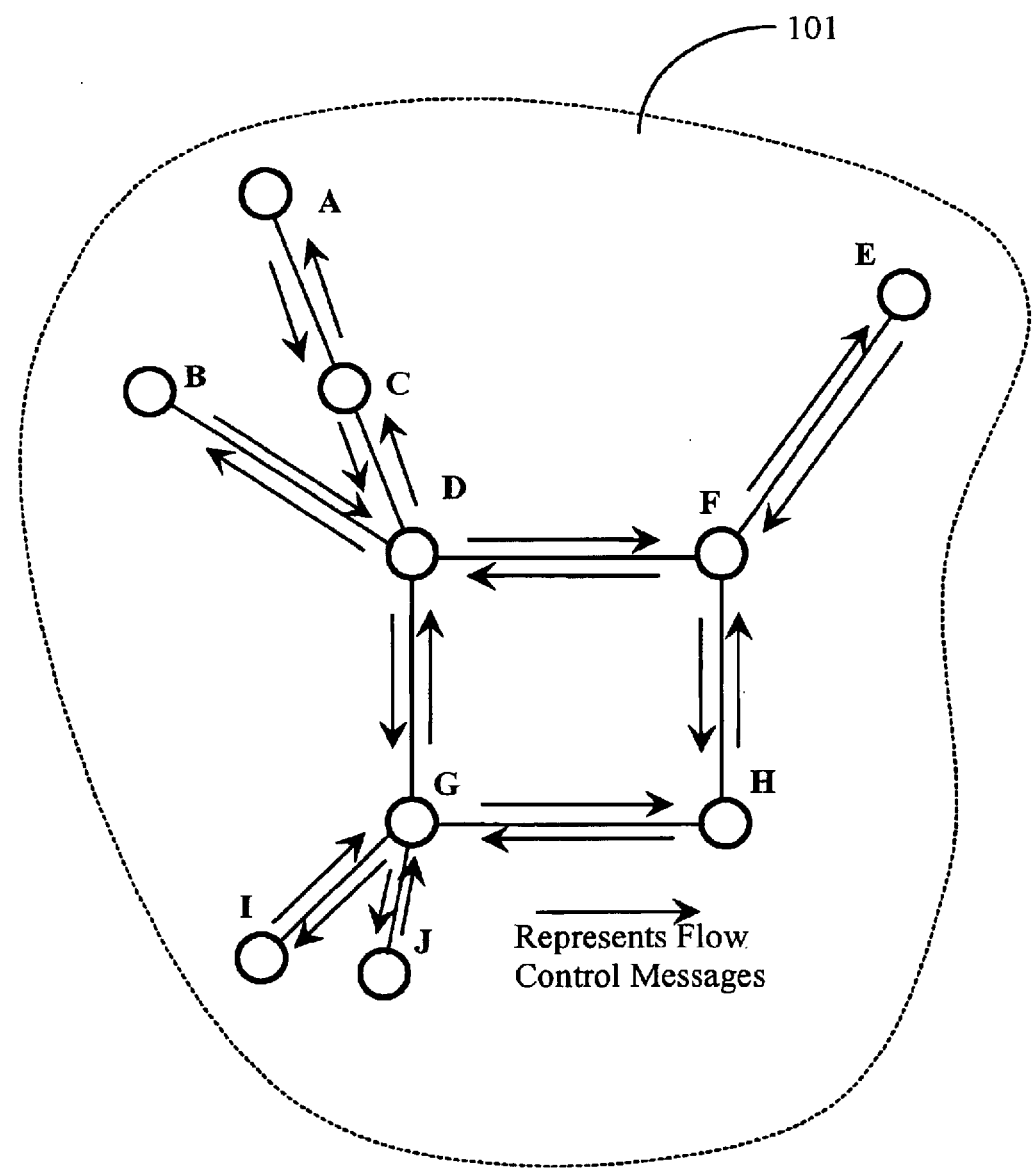
FIG. 1 is a prior art diagram illustrating fabric node interconnections and upstream propagation of flow control messages.
Figure 2:
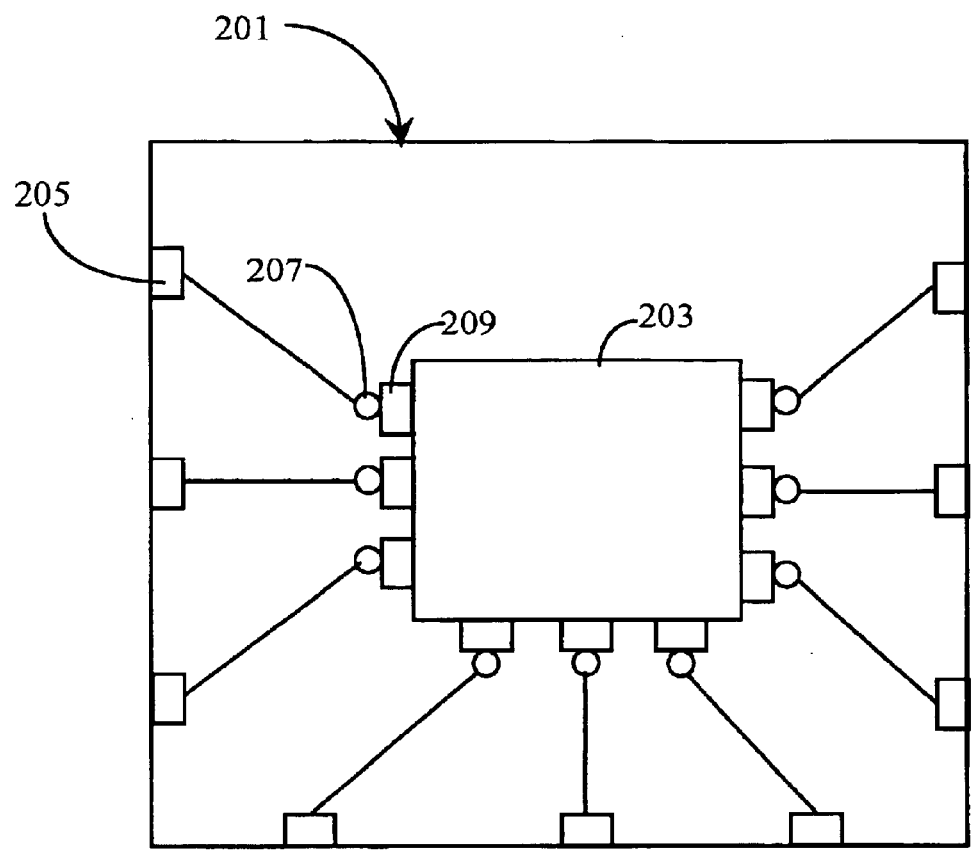
FIG. 2 is a diagram of a fabric card in an embodiment of the present invention.

FIG. 2 is a plan view of a fabric card 201 in an embodiment of the present invention. In this embodiment there are nine (9) ports on each card, rather than four as indicated in the prior art diagram of FIG. 1. This is not meant to imply that the prior art is limited to four ports per node, as FIG. 1 was exemplary only.

In the fabric card of this embodiment, as shown in FIG. 2, there are nine queue managers 209, one for each external port 205, with each queue manager isolated from its connected external port by an optical interface 207. The inter-node communication in this embodiment is by optical links. Queue managers 209 interface with crossbar 203, which connects each of the nine ports with the other eight ports internally in this embodiment, although these internal connections are not shown in the interest of simplicity.

Figure 3:
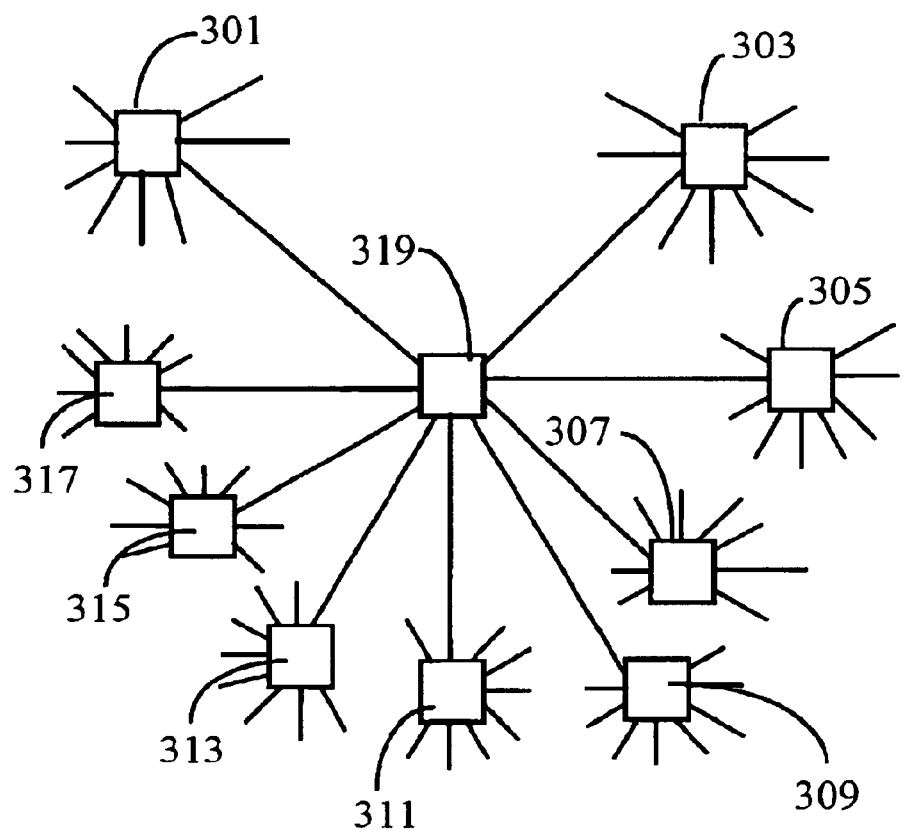
FIG. 3 is a diagram of a fabric network of fabric cards in an embodiment of the present invention.

FIG. 3 is a diagram illustrating a fabric having interconnected fabric cards according to the embodiment described above with reference to FIG. 2. In this diagram one card 319 is shown connected to nine neighbor cards 301, 303, 305, 307, 309, 311, 313, 315, and 317. Each of the neighbor cards is illustrated as having eight additional ports for interconnecting to further neighbors in addition to the one port connecting the near neighbor with card 319. It will be clear to the skilled artisan from this diagram that interconnection complexity escalates at a very great rate as ports and cards (nodes) proliferate.

Referring now back to FIG. 2, each port on each card passes through a queue management gate 209 as indicated in FIG. 2. Each queue manager comprises a temporary storage queue with controls for managing flow in the incoming direction. Data traffic coming in on any one port, for example, passes through a first-in-first-out (FIFO) queue, and the queue manager is simply enabled to discard al traffic when the queue overflows. There are, in this scheme, no Flow Control messages generated and propagated upstream as in the prior art. The size of each queue is set to provide adequate flow under ordinary, and to some extent extraordinary load conditions without data loss, but under extreme conditions data is simply discarded until the situation corrects, which the inventors have found to be less conducive of data loss than the problems associated with conventional flow control, which uses the upstream propagated Flow Control messages.

In an alternative embodiment of the present invention each queue manager on a card has an ability to begin to drop packets at a pre-determined rate at some threshold in queue capacity short of a full queue. In certain embodiments further the queue manager may accelerate the rate of packet dropping as a queue continues to fill above the first threshold. In these embodiments the incidence of dropping packets is minimized, and spread over more traffic than would be the case if dropping of packets were to begin only at a full queue, wherein all packets would be dropped until the queue were to begin to empty.

A distinct advantage of the queue management scheme of the present invention is that the intelligence required is considerably lessened, and there is no artificial addition to the traffic load by generating Flow Control messages.

It will be apparent to the person with ordinary skill in the art that the embodiments of the invention described in this specification are exemplary, and may vary in a number of ways without departing form the spirit and scope of the present invention. For example, there may be more or fewer than nine ports and queue managers per card, and the size of each queue may vary.

Multicasting Data Within Router Fabric

According to another aspect of the present invention a router fabric card analogous to the card of FIG. 2 above is enhanced by virtue of added circuitry for the purpose of performing on-board, and in some instances, off-board multicasting of data packets.

Figure 4:
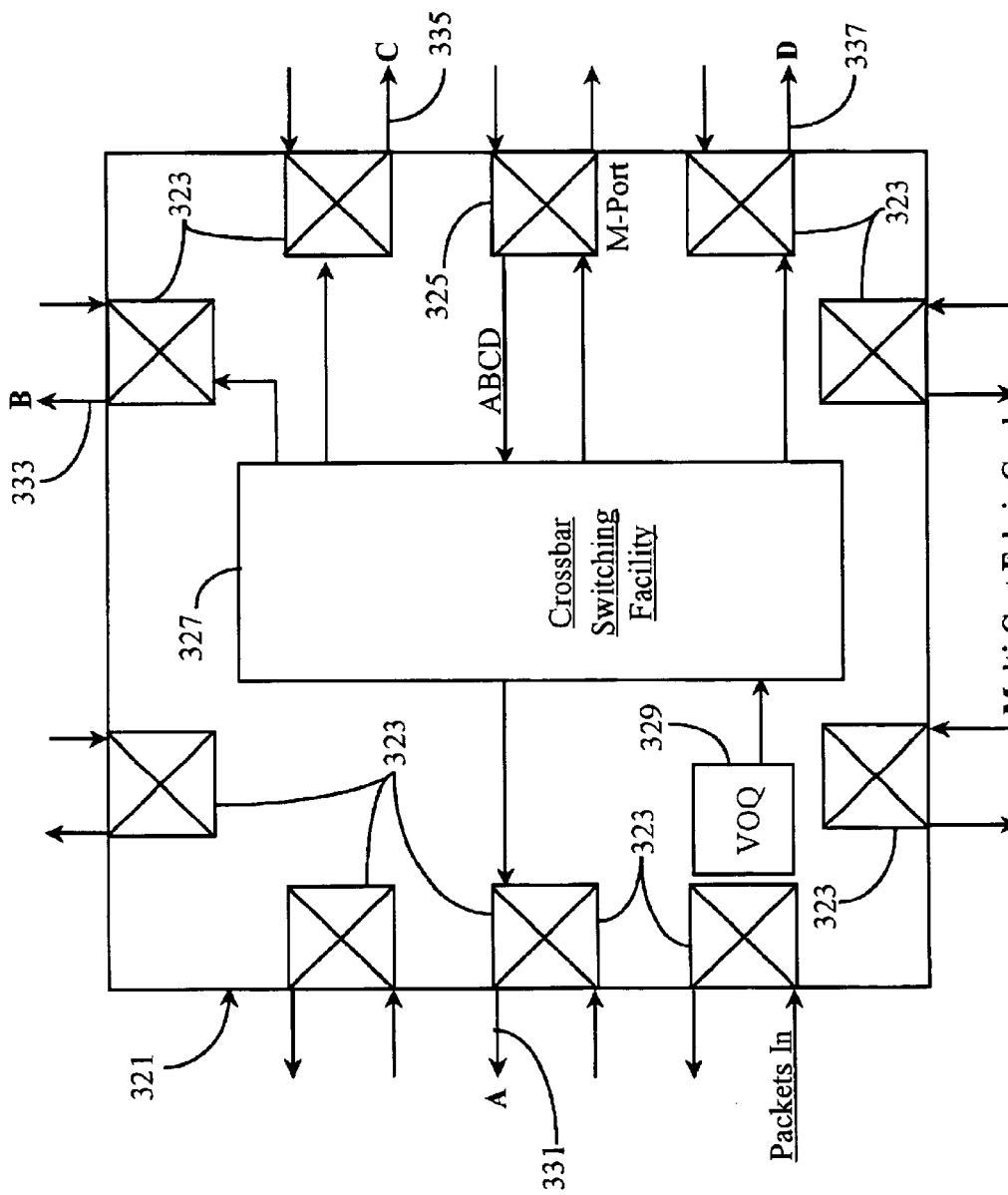
FIG. 4 is a diagram of a fabric card of a data router having multicasting capability via a multicast port according to an embodiment of the present invention.

FIG. 4 is a plan view of a fabric card 321 of a data router having multicasting capability according to an embodiment of the present invention. In this embodiment a Multicast Fabric Card 321 is configured with an M-Port (multicasting port) 325. Card 321 also has a plurality of Virtual Output Queues, one of which is illustrated in this example as a (VOQ) 329. Typically a VOQ is implemented at each port of the card, although all are not shown in FIG. 4 for the sake of simplicity. Card 321 also has a Crossbar Switching Facility 327 implemented thereon and nine (9) ingress/egress ports 323 such as were described with reference to FIG. 2 above.

M-Port 325 is an added ingress/egress port in this embodiment, which is enhanced in this example with multicasting capability. Each port 323 on card 321 is, in a preferred embodiment, an ASIC chip. However, in certain embodiments, a chip set or other implementation may be used. Crossbar Switching Facility 327 is adapted for provision of switching function and negotiation between ingress and egress port 323 of card 321. The integrated components and detail of the functionality of the Crossbar Switching Facility 327 is not illustrated in this example as such detail is not considered significant to the scope of this invention. The makeup of the routing fabric of a given router in this example may be assumed to contain a plurality of cards 321.

Virtual Output Queue (VOQ) 329 is logically illustrated between one of ingress/egress ports 323 and Crossbar Switching Facility 327. VOQ 329 contains a queue for every egress (output) on card 321 including one for M-port 325 and one for the multicasting component of M-port 325, which is further detailed below. The direction of data flow from VOQ 329 into facility 327 is indicated by a directional arrow illustrated there between. In actual practice, there is a VOQ 329 implemented for each of the nine ports 323 and one for M-Port 325, operating on ingress traffic at each port. Each VOQ is partitioned into a plurality of queues representing all egress destinations of card 321 as previously described.

The intrinsic design of card 321 leaves provision for installing more than one multicast port (M-Port 325) on each card, however in this exemplary diagram, only one M-Port is shown, and this is deemed sufficient for the purpose of explaining the present invention. In addition, one or more multicast ports (325) on any one card (321) can be activated or deactivated according to projected need. Therefore on a fabric card (321) with multiple multicast ports (325), one, two, or more multicast ports may be activated for service depending on projected load and needs of the multicast system. When projected volume of a particular multicast assignment demands, some or all multicast ports on enhanced fabric cards within a router may be activated for the duration of the increased load. It is noted herein that all fabric cards in a router need not be enhanced for multicasting but it may be assumed that a plurality of cards in a fabric of any router or routers (distributed) may be multicast enhanced.

In a preferred embodiment, a multicast assignment is orchestrated to fan out through fabric within a router, and such an assignment may also be distributed to communicating multicast-enhanced routers distributed strategically throughout the topology of a data network. In this way, a natural load balance may be achieved and processing is efficiently distributed, rather than the inefficient present system of generating multiple copies at one place, and then sending all through the network. For a very large assignment a plurality of multicast-enhanced routers may perform assigned portions of the entire project.

Returning again to FIG. 4, data packets destined for multicasting in M-port 325 enter card 321 as indicated by a directional arrow labeled Packets In (ingress to one of ports 323). Packets may arrive at any one of ports 323 that are coupled by port paths to output ports of the fabric card. Packet In represents multicast data packets destined for M-port 325 and are queued for M-port 325 in VOQ 329. It is again noted that VOQ 329 functions as a set of queues with a queue manager, and the queues are associated with output ports. VOQ 329 manages incoming data traffic and functions as a temporary storage queue with control for managing data flow in the incoming direction. Incoming data traffic is passed from an ingress port of card 321 to an egress port of the node as long as the queue in the path between ports is less than full as described with reference to FIG. 2 above.

A data packet for multicasting is queued by VOQ 329 in the same way that other packets are queued, except that the queue destination is M-port 325 instead of the destination of an egress (all packets identified as multicast packets are sent to the M-Port). In this example, data packets for multicasting pass from VOQ 329 through the Crossbar Switching Facility and into M-Port 325 where the data packets are replicated according to predetermined instructions. In this exemplary illustration replicated data packets are represented by the capital letters A, B, C, and D. Replicated data packet A–D are identical to one another except for destination address, which is assigned by M-Port 325 as a part of the replication process, according to information stored in a multicast group table (not shown) accessible to the multicast port. More detail about internal components of M-port 325 is provided later in this specification, particularly with reference to FIG. 5.

M-Port 325 receives the targeted data packets, as is illustrated by a directional arrow emanating from facility 327 and progressing toward port 325, and replicates the data packet into packets A–D according to instructions. The replication of incoming packets into packets with four new destinations is exemplary only, and there may be fewer or many more replications than indicated in this example.

Port 325 assigns appropriate destination addresses for packets A–D and then queues the data packets for egress to the next point in their destinations as though the replicated data packets were non-multicast incoming data packets. Packets A–D are illustrated herein as leaving port 325 back into facility 327.

In this example replicated packets A, B, C, and D are routed off card 321 at separate egress ports as indicated by directional arrows emanating from various ports 323, the arrows identified by indication of the appropriate data packets A–D and by element numbers 331, 333, 335, and 337 respectively. In this example, egress paths 331–337 carrying data packets A–D lead to ingress paths of other fabric cards, determined by their new destinations. Other fabric cards may in turn provide further packet replication. If card 321 is a last card before router output, then the replicated packets are routed to a next router for further processing, which may, in some projects, include more packet replication. It is noted herein that it is not required that packets A, B, C, and D be routed off card 321 using separate paths as illustrated in order to practice the invention.

In one embodiment, all packets could be routed off card 321 using a single or several ports. The use and selection of outgoing ports depends entirely on destination assignments of the packets concerned. For example, it is not required that a particular multicast packet, which may be a replicate, be routed to multiple multicast-capable ports in succession for further replication. In fact, a designation of unicast may be applied for a time to a particular packet causing it to be routed as a normal data packet until, perhaps after routing through several cards within a router, it enters a card wherein further multicasting will be performed. At entrance to the desired card, the unicast designation will be stripped from the packet header of a particular packet revealing the multicast destination to an M-port on the card. Addressing manipulation capability can be performed at any input port on any router card by port manipulation of packet headers.

It will be apparent to one with skill in the art that card 321 may have more or fewer ports 323 than are illustrated in this example without departing from the spirit and scope of the present invention. Likewise, there may be more than just one M-port 325 integrated onto card 321. The number of both conventional ports and ports enhanced for multicasting, as well as their activity states during operation, is a matter of design and implementation.

Figure 5:
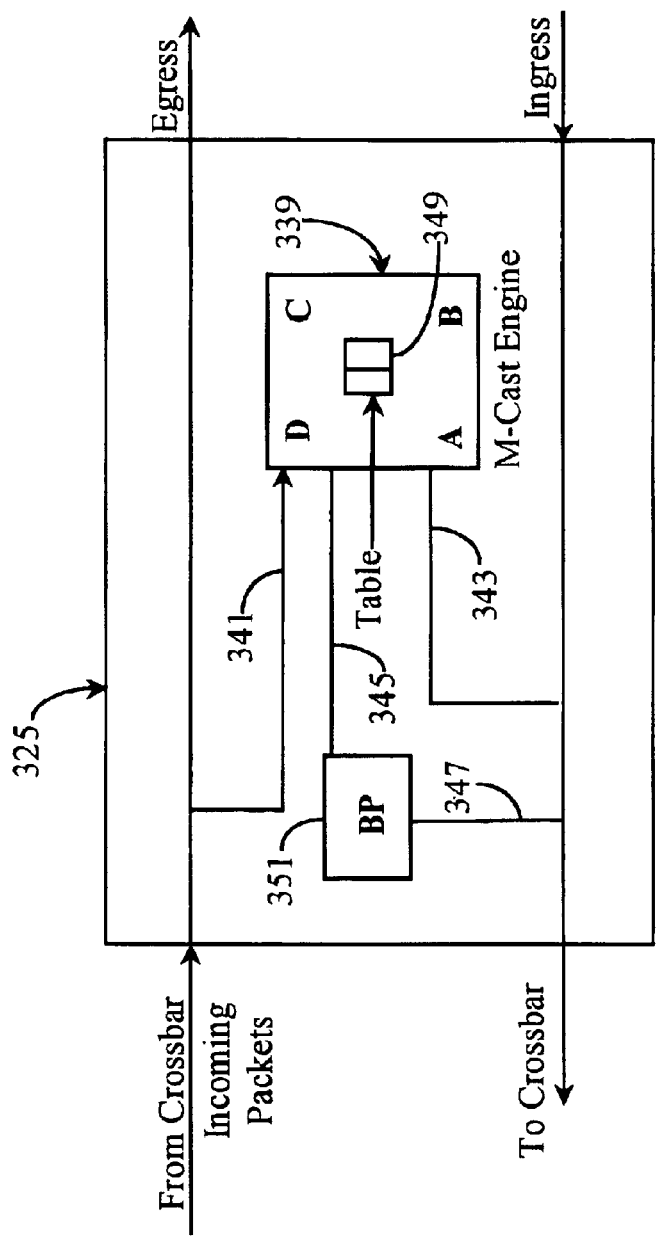
FIG. 5 is a block diagram illustrating components of the multicast port of FIG. 4.

FIG. 5 is a block diagram illustrating various components and connectivity of M-Port 325 of FIG. 4 in an embodiment of the present invention. In addition to the multicasting role of M-Port 325 as described above, data packets not designated for multicasting may have ingress/egress through this port with requirements for exclusion of data in or out during periods when the multicast port is actively involved with multicasting/replicating duties. In this example, the fact that normal traffic cannot use port 325 during active multicasting is due to the fact that, in this embodiment, multicast packets are looped back into the system (card) as incoming packets. However, in a more enhanced embodiment, additional components may be added to enable both normal traffic and multicast traffic to utilize port 325 simultaneously.

Port 325 is illustrated with an egress path (from C-Bar to egress) and an ingress path (from ingress to C-Bar). These paths comprise the basic routing paths of port 325 for normal (non-multicast traffic). A multicast (M-Cast) engine 339 is provided as the replicating component of port 325. Engine 339 may be implemented with basic logic circuitry as an integrated part of the ASIC enabling port 325, or as a separate chip in some embodiments. It is noted herein that engine 339 is ported to enable receipt of data as well as communication with other port-engines on a same fabric card and on other multicast-capable fabric cards.

Basic functionality in the present embodiment of the invention involves incoming multicast packets destined for port 325 (identified herein as Incoming Packets) entering port 325 from the Crossbar Switching Facility (327, FIG. 4) and delivered to engine 339 by an input line 341 for packet replication.

Packets identified as packets A, B, C, and D illustrated within engine 339 are subject to destination address assignment by engine 339 from routing information stored in a table 349 also illustrated within engine 339. Table 349 contains a list of IP destinations of a multicast group for a given multicast project. Table 349 is periodically updated and propagated between active multicast ports as was described with reference to FIG. 4 above.

Multicast engine 339 replicates data packets based on instruction, in this example packets A–D. It is noted herein that an incoming data packet functioning as a source for replication may be dropped after replication, or may be retained with the same or a new destination address assigned thereto. More specifically, one of packets A–D may be the source packet (3 replications), or all packets A–D may be replications with the source packet dropped (four replications). States of addresses (taken or not) in table 349 are updated as used in order to provide current information to all ports during an active multicast project. Table 349 is periodically updated at all multicast ports within a router fabric, and in some cases among multiple routers, in order for all ports to remain current with regard to how many replications of data packets need to be generated and what ultimate destinations need to be assigned to the replicated packets.

Once engine 339 completes the replication and address assignment for a given (assigned) portion of a multicast project, replicated data packets, represented in this example as A, B, C, and D, are transmitted via exemplary line 343 to the ingress path of port 325 as incoming data packets. Packets A–D are then queued in appropriate sections of a VOQ (not shown) associated with port 325. Packets A–D ultimately enter Crossbar Switching Facility 327 (FIG. 4) for distribution over various paths according to the assigned addresses for the replicated data packets. It is noted herein that the clock speed of port 325 is essentially the same as any of ports 323 (FIG. 4). However, in one embodiment, the speed of replication is enhanced by using an increased clock speed for M-Cast Engine 339 above that of other ASIC devices in the fabric card.

In order to maintain appropriate management of data flow through port 325, a Back-Pressure (BP) module 351 is provided and adapted to prevent input of new data into port 325 during replicating (multicasting) activity of the engine. BP module 351 interfaces with M-Cast engine 339 via a control line 345 to monitor the ongoing activity of the engine. When it is determined that engine 339 is fully involved with replicating and address assignment of data packets during a particular multicast project, BP module 351 notifies Crossbar Switching Facility (327) via a control line 347 not to input additional new data packets for processing by the engine until the current effort is completed.

It will be apparent to one with skill in the art that engine 339 may replicate a higher or lower number of data packets than the number illustrated in this example without departing from the spirit and scope of the invention. The number of packets replicated is determined from assignment data. In a preferred embodiment, all active engines during a project receive a similar portion of a multicast project. However, in more advanced embodiments, existing network load conditions including predictive algorithms may be used to change multicast assignments with respect to engines, cards, and even routers involved. There may be many such embodiments.

Figure 6:
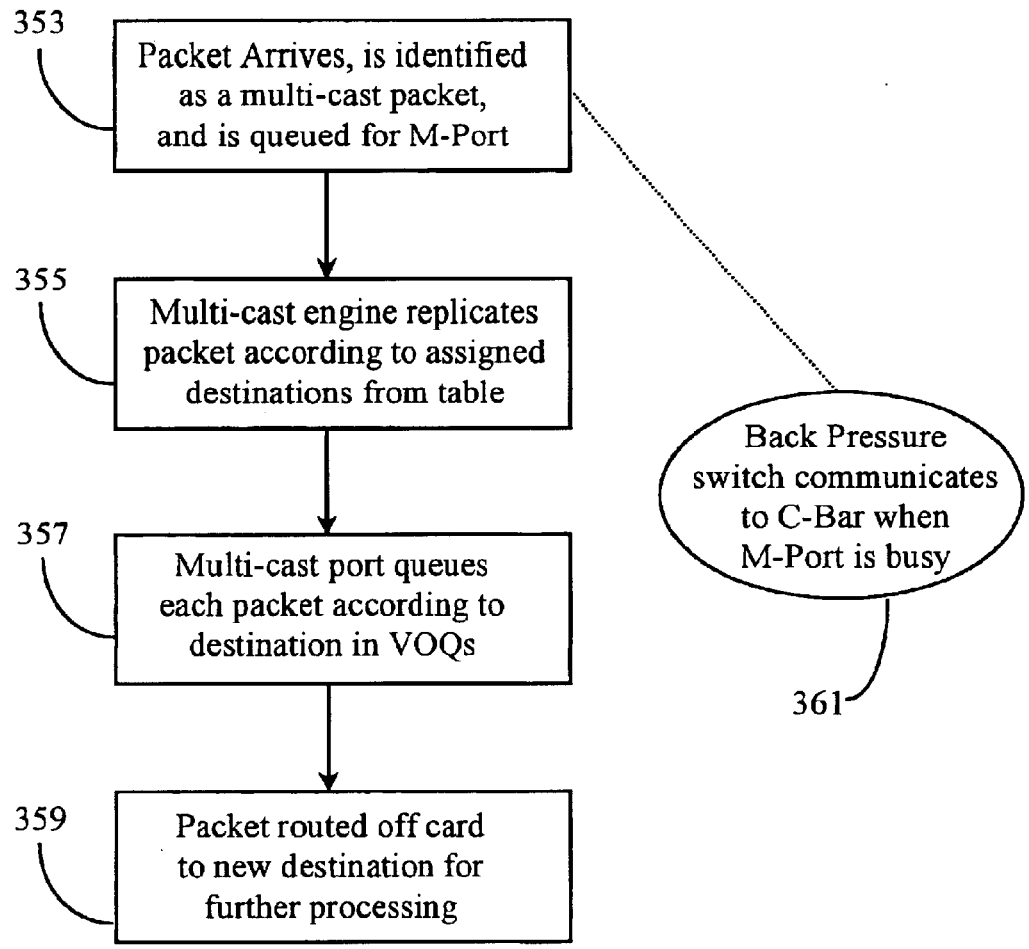
FIG. 6 is a flow diagram illustrating a packet replication process of a multicast fabric card according to an embodiment of the present invention.

FIG. 6 is a flow diagram illustrating basic steps of data packet processing by the Multicast Fabric Card described with reference to FIG. 4. According to an embodiment of the present invention step 353 denotes the arrival of a data packet designated for multicasting. The data packet, arriving through an ingress path of a multicast-enabled card is queued for an M-Port analogous to port 325 of FIG. 4. The queuing assignment is based on destination addressing of the incoming packet. A dotted line illustrated in this example from Step 353 to Step 361 denotes a continuous monitoring of data flow to the multicasting port of step 353 by a BP Module analogous to module 351 of FIG. 5. As described with reference to FIG. 5, BP module 351 communicates to Crossbar Switching Facility (327) when port 325 is busy with packet replication and address assignment activity.

At step 355, the multicast engine within the port of step 353 replicates the packet the necessary number of times, and assigns destination addresses according to a multicast group table analogous to table 349 of FIG. 5.

In Step 357 the multicast port of step 353 queues each replicated packet according to destination into a VOQ analogous to queue 329 of FIG. 4. Such a VOQ exists at each ingress/egress port of a fabric card. Each queued packet resides in queue according to its assigned destination address for egress from a multicast card. In Step 359 each packet is routed from the fabric card along a predetermined path to its assigned destination for further processing as required for a given multitask project. In some cases the destination leads to ingress at a port on another multicast card. In some cases, a next card will not be a multicast card. In some cases egress is to a next router or to a final IP destination. It will be apparent to one with skill in the art that the process steps illustrated in this example may be further broken down into sub-steps without departing from the spirit and scope of the present invention. For example, a sub-step may be included before step 355 for updating a multicast group table. It will also be apparent to one skilled in the art that the embodiments of the invention described in this specification are exemplary and may vary in a number of ways or configurations without departing from the spirit and scope of the present invention. For example, a fabric card may contain more or fewer than nine ports and any one or all of the ports may be multicasting ports. Likewise, in some embodiments, the clock speed of included multicasting ports may be varied and selectable depending on the load of data packet transmission, as previously described.

According to an alternative embodiment, a multicasting card may be connected to a multicasting port of a fabric card, the multicasting card provided as an external addition. In this case data packets for multicasting egress from the fabric card into the multicasting card, where the replication and destination assignments are made, then egress from the multicasting card back into the fabric card for re-routing according to the newly-assigned addresses. In some cases using an external port, the egress of the port may be coupled to a next card having a dedicated multicast ingress port.

The present invention may be implemented in a variety of configurations of interconnected fabric cards, and routers enhanced to practice the invention may be geographically distributed within a given network topology in order to enhance multicasting capability throughout the topology. One skilled in the art will recognize that multicasting efficiency escalates proportionally at a tremendous rate as additional cards and ports are added to single routers and as similarly enhanced routers are distributed within a multicast region.

There are many other alterations within the spirit and scope of the invention as well, and the scope of the invention is limited only by the claims, which follow.

What is claimed is:

1. In a fabric card having multiple ports, one or more multicast-capable ports for replicating multicast data packets comprising:
    at least one ingress path into the port for receiving the data packets;
    at least one egress path out of the port for outputting data packets; and
    a multicast-capable component coupled to the egress and ingress paths of the port, the multicast-capable component for replicating and/or readdressing the replicated data packets;
    characterized in that data packets assigned for multicasting arrive at the port on the egress path and are diverted to the multicast-capable component, wherein the packets are replicated and/or re-addressed and output to the ingress path into the port.

2. The multicast-capable port of claim 1, wherein the port is hosted on a card within a data router.

3. The multicast-capable port of claim 2, coupled to other ingress/egress ports of the card.

4. The multicast-capable port of claim 3, wherein more than one multicast-capable port is mounted on a same card.

5. The multicast capable port of claim 2, wherein there are multiple cards within the data router, individual ones of which host at least one multicast-capable port.

6. The multicast-capable port of claim 2, wherein the data router is connected to other like data routers distributed over network topology and wherein individual ones of the multicast-capable ports associated therewith are responsible for a portion of a multicast project.

7. The multicast-capable port of claim 1, wherein the port is an integrated circuit.

8. The multicast-capable port of claim 7, wherein the multicast-capable component is implemented as an integrated circuit externally from the port.

9. The multicast-capable port of claim 4, wherein there is a table containing instruction for multicasting, table entries being configured by software.

10. A multicast-capable fabric card within a data router comprising:
    at least two ports coupled to each other by data paths;
    at least one multicast engine coupled to at least one of the ports forming at least one multicast-capable port;
    at least one ingress path into each port for receiving data packets; and
    at least one egress path out of each port for outputting data packets;
    characterized in that data packets assigned for multicasting arrive at the multicast-capable fabric card and are delivered to the multicast engine wherein they are replicated and/or modified as needed for multicast and output to the ingress path into the multicast port, and further characterized in that the multicast engine is integrated into circuitry of the at least two ports of the fabric card in the router.

11. The multicast-capable fabric card of claim 10 coupled by port paths to other cards within the same router.

12. The multicast-capable fabric card of claim 10, wherein a switching facility is provided on the card, the switching facility for managing port-to-port communication.

13. The multicast-capable fabric card of claim 10, wherein the multicast-capable port is an integrated circuit.

14. The multicast-capable fabric card of claim 10, wherein there is a table containing instruction for multicasting, table entries being configured by software.

15. A multicast-capable data router having a multicast-capable port for replicating multicast data packets, the port having at least one ingress path into the port for receiving the data packets, at least one egress path out of the port for outputting data packets, and a multicast-capable component coupled to the egress and ingress paths of the port, the multicast-capable component for replicating data packets and re-addressing the replicated data packets;
    characterized in that data packets assigned for multicasting arrive at the port on the egress path and are diverted to the multicast-capable component, wherein the packets are replicated or re-addressed and output to the ingress path into the port.

16. The router of claim 15 wherein the multicast-capable component is integrated into the circuitry of the multicast-capable port.

17. The router of claim 15 wherein the multicast-capable port is a fabric card port.

18. The router of claim 15 wherein the multicast-capable port is the port of a fabric card external to the router.

19. The router of claim 15 further comprising a table containing instructions for multicasting.

20. A multicast-capable data router having a fabric card comprising circuitry for at least two ports coupled to each other by data paths;
    at least one multicast engine coupled to at least one of the ports forming at least one multicast-capable port;
    at least one ingress path into each port for receiving data packets;
    at least one egress path out of each port for outputting data packets;
    characterized in that data packets assigned for multicasting arrive at the fabric card and are delivered to the multicast engine wherein they are replicated and/or modified as needed for multicast and output to the ingress path into the multicast-capable port, and further characterized in that the multicast engine is integrated as a part of the multicast-capable port of the fabric card in the router.

21. The router of claim 20 further comprising a table containing instructions for multicasting.

22. A multicast-capable data router, comprising circuitry for a multicast engine and having one or more first ports for communicating with one or more second ports of one or more fabric cards, each port having at least one each of an ingress path and an egress path, and port circuitry for modifying or replicating multicast packets routed to the engine;

characterized in that multicast packets received from the one or more fabric cards are replicated and/or modified as needed, and output to the ingress path via one or more of the first ports to one or more of the second ports, and further characterized in that a circuitry of the multicast engine is integrated into a circuitry of one of the ports of the fabric card.

23. The router of claim 22 further comprising a table containing instructions for multicasting.

24. A method for multicasting comprising steps of:

(a) providing a plurality of multicast engines within a router, each having one or more first ports for communicating with second ports of the router, each port having at least one each of an ingress path and an egress path;

(b) receiving multicast packets at one of the second ports and sending the multicast packets to one of the multicast engines via the first ports;

(c) replicating and/or modifying the data packets for multicasting according to tabled instructions associated with the multicast engine; and (d) outputting the replicated or modified packets to the ingress path to individual ones of the second ports;

wherein the multicast engine is integrated as a part of a port of a line card in the router.

25. The method of claim 24 wherein the multicast engine is integrated as a part of a port of a fabric card in the router.

26. The method of claim 24 wherein the multicast engine is a stand-alone component and the second ports, with which the first ports communicate, are ports of one or more fabric cards in the router.

27. The method of claim 24 wherein, in step (a) there are a plurality of interconnected routers, individual ones having multicast engines, and wherein, in step (d), replicated or modified packets are forwarded to individual ones of the plurality of interconnected routers.

28. The method of claim 27 wherein the tabled instructions associated with individual multicast engines are updated periodically.

* * * * *